(12) United States Patent
Xu et al.

(10) Patent No.: US 10,674,670 B2
(45) Date of Patent: Jun. 9, 2020

(54) HIGH-EFFICIENCY CRAWLER-TYPE PICKUP BALER AND AUTOMATIC BALE STACKING SYSTEM

(71) Applicant: JIANGSU UNIVERSITY, Jiangsu (CN)

(72) Inventors: Lizhang Xu, Jiangsu (CN); Zhipeng Gao, Jiangsu (CN); Yaoming Li, Jiangsu (CN)

(73) Assignee: JIANGSU UNIVERSITY (CN)

( * ) Notice: Subject to any disclaimer, the term of this patent is extended or adjusted under 35 U.S.C. 154(b) by 0 days.

(21) Appl. No.: 15/741,147

(22) PCT Filed: Aug. 31, 2016

(86) PCT No.: PCT/CN2016/097601
§ 371 (c)(1),
(2) Date: Dec. 29, 2017

(87) PCT Pub. No.: WO2018/039998
PCT Pub. Date: Mar. 8, 2018

(65) Prior Publication Data
US 2020/0029504 A1    Jan. 30, 2020

(30) Foreign Application Priority Data

Aug. 29, 2016  (CN) .......................... 2016 1 0747821

(51) Int. Cl.
*A01D 37/00*    (2006.01)
*A01D 89/00*    (2006.01)
(Continued)

(52) U.S. Cl.
CPC .......... *A01D 89/001* (2013.01); *A01D 37/00* (2013.01); *A01D 85/005* (2013.01);
(Continued)

(58) Field of Classification Search
CPC ........ A01D 41/00; A01D 41/12; A01D 34/04; A01D 61/008; A01D 43/006;
(Continued)

(56) References Cited

U.S. PATENT DOCUMENTS 4,846,198 A  *  7/1989  Carnewal ............... A01D 41/00
                                                        460/21
5,682,683 A  *  11/1997  Haimer ................ A01D 43/003
                                                        34/210
(Continued)

FOREIGN PATENT DOCUMENTS

CN    202135497    2/2012    ............ A01D 37/00
CN    103988631    8/2014    ............ A01D 41/02
(Continued)

OTHER PUBLICATIONS

International Search Report (w/translation) and Written Opinion (no translation) issued in application No. PCT/CN2016/097601, dated Dec. 9, 2016 (9 pgs).

*Primary Examiner* — Robert E Pezzuto
(74) *Attorney, Agent, or Firm* — Hayes Soloway P.C.

(57) ABSTRACT

A high-efficiency pickup baler crawler and automatic bale stacking system, includes a straw pickup stubble harvesting device, a continuous conveying preloading device, a lower feeding type compression and baling device, a bale transportation and arraying device, a bale stacking device, a walking device and a counting control. The counting control which controls the amount of bale compression chamber discharge, is used to control the bale conveying device and bale stacking device, to achieve the goals of automatic conveying, pushing and stacking, and avoids artificial secondary handling and improves the working efficiency of the system.

10 Claims, 9 Drawing Sheets

(51) Int. Cl.
*A01D 85/00* (2006.01)
*A01D 87/12* (2006.01)
*A01D 90/08* (2006.01)
*A01F 15/10* (2006.01)

(52) U.S. Cl.
CPC ......... *A01D 87/126* (2013.01); *A01D 89/004* (2013.01); *A01D 89/006* (2013.01); *A01D 90/08* (2013.01); *A01F 15/10* (2013.01); *A01D 2085/007* (2013.01)

(58) Field of Classification Search
CPC .... A01D 89/001; A01D 37/00; A01D 85/005; A01D 87/126; A01D 89/004; A01D 89/006; A01D 90/08; A01F 7/062; A01F 15/10
USPC ......... 56/341–344, 13.5, 14.6; 460/100, 119, 460/134, 24; 100/88, 3, 161, 168
See application file for complete search history.

(56) References Cited

U.S. PATENT DOCUMENTS

| | | | |
|---|---|---|---|
| 6,421,996 B1* | 7/2002 | Deutsch | A01D 46/084 100/88 |
| 7,591,628 B2* | 9/2009 | Noonan | A01D 87/127 100/89 |
| 8,250,843 B2* | 8/2012 | Campbell | A01D 41/14 100/100 |
| 8,313,362 B2* | 11/2012 | Roberge | A01D 41/1252 460/111 |
| 9,107,342 B2* | 8/2015 | Abbott | A01D 41/06 |
| 2017/0150678 A1 | 6/2017 | Li et al. | A01D 41/00 |

FOREIGN PATENT DOCUMENTS

| | | | |
|---|---|---|---|
| CN | 104054449 | 9/2014 | ............ A01D 41/00 |
| CN | 203896748 | 10/2014 | ............ A01D 41/02 |
| CN | 105191565 | 12/2015 | ............ A01D 37/00 |
| JP | 2011182743 | 9/2011 | ............ A01D 41/02 |
| SU | 1109084 | 8/1984 | ............ A01D 41/02 |

* cited by examiner

HIGH-EFFICIENCY CRAWLER-TYPE PICKUP BALER AND AUTOMATIC BALE STACKING SYSTEM

TECHNOSPHERE

The invention belongs to the technical field of agricultural machinery design, specifically is a high-performance crawler-type pickup baler and automatic bale stacking system, can be used for straw bale compressing, picking up, stacking and joint operation in the "deep mud" field.

BACKGROUND TECHNOLOGY

In our country, the combine of rice and wheat is usually return the straw to the field by using a pulverizator to pulverize the stalks to the field after harvesting rice and wheat. With straw is not easy to rot in the field, and long-term straw returned and the soil is no effective of deep plowing, in some area of our country, the surface soil contains a lot of organic humus, the soil is too loose, severely damaged the crumb structure and physical properties of the soil, in addition to affecting the normal crop growth, can easily lead to crop reduction of output, lodging and cause high yield without foison. Due to various reasons, farmers want to remove the fragment straw out the field or burn it in the field, that cause straw burning rampantly, serious impact on air quality, the instruction of the government is difficult to solve. Rice and wheat straw is a kind of biological resources that easy to obtain, in foreign developed countries, use straw as a new type alternative fuels of biofuels. Some countries extracted alcohol fuel from cellulose of straw, some are used for roughage to feed livestock. Then the straw pickup baling machine began to show up, which compressing and baling the wheat and rice straw that separated and threshed but haven't be shattered, and arrange it in the field orderly. Farmers sell the compressed and baled straw to power plants or used for other purposes, which effectively reduce the influence on crops next season, and can also provide fuel for power plants, fully relieve the energy crisis.

In recent years, the international famous companies such as John Deere & Company, AAS and other European and American multinational companies of agricultural machinery design baling machine mostly are wheeled tractor large baling machine, which are characterized in that with a large amount of feeding, high efficient and high intelligent degree, but the wheel traction machine is mainly used for pasture harvest and baling, generate a large and quadrate bale, it is difficult to adapt to the requirements of Chinese deep mud field and small and medium size field. Therefore, it is high time to design a high-efficiency crawler-type collecting baling machine adapt to the environment where deep mud and small plots in a kind of super rice producing area in south of China with a big straw tank and automatic bale stacking system to improving performance and efficiency.

Chinese patent 201510673973.6 published a self-propelled wheeled picking up and baling device that can pick up bundles of straw material scattered in the field, and can be used to cut and recycle high stubble straw. China patent 201120247653.1 published a straw baling machine of rice and wheat harvest, design a kind of compression bale device that could bale chaff separated by cleaning sieve and straw, the effect of pickup and bale performance is completely. Chinese patent 201420216014.2 released a combine of rice and wheat harvest and bale in the integration of multiple operation, can also accomplish the task of the grain harvest of rice and wheat and straw compression and bale after threshing, avoids the typing machine go into the field the second time.

But the above patent design of baling machine's wheeled walking system cannot operation in the environment where deep mud and small plots in a kind of super rice producing area in south of China, and directly put bale in the field result in bale damp affected with water and be rot, the bale is unfavorable to storage. In addition, the picking and stubble cutting system it can't automatic match the walking speed, etc. Due to the manual or mechanical transmission of the bale, the labor intensity and the number of machines increasing, it is not benefit to the integration and improvement of processing efficiency. In existing collecting device of pickup and bale device, generally no coping device, it is poor to adapt to the landform, cannot adjust according to the height of the ground ups and downs of collecting, which will makes the elastic tooth of the pickup device hit the ground when ground big ups and downs, not only influence on the performance of straw collecting homework, but also might damage the teeth. In addition, the straw moisture content is higher when the rice harvest, the high friction of straw and easy to wind straw, it is easily break down when pickup and transport straw, such as the straw transportation not smooth, frequent jam and other issues, result in the tursser fails in the actual work process, the machine performance is not stable and the efficiency depend on the proficiency of the driver, which seriously affected the work efficiency. Due to the existence of various problems, it is difficult for existing collecting and baling machine to adapt to the operation requirements of the small scale production in deep mud and alternate plant zone rush-harvest and rush-plant in our country.

SUMMARY OF THE INVENTION

According to the problems such as pickup, cutting can't synchronized with the machine operating speed, poor adaptability, picking up is not clean, the inlet of straw conveying device and the bundling device are easy block, bales placed directly in the field need artificial re-handling, time-consuming problem, etc, this invention designs a high-performance crawler-type pickup baler and automatic bale stacking system, can pick up the rice and wheat straw scattered in the field and stubble harvest in a high speed, and have a certain ability to coping the rolling ground, and can realize the automatic matching of picking, stubble harvesting and machine operation speed, automatic stacking storage for the bale, and transport the bale to place convenient to storage. The baler has the advantages of good performance, high efficiency, high integration degree and little malfunction, etc.

The invention realizes the above purpose by the following technical means:

High-efficiency crawler-type pickup baler and automatic bale stacking system, which is characterized in that mainly including straw picking stubble harvesting device, continuous conveying preloading device, lower feeding type compression bundling device, walking device and the control system. Continuous conveying preloading device, beneath feeding type compression bundling device, bale conveying array device and bale stacking device are arranged on the frame of walking device; pick up straw stubble harvesting device mounted in the third axis of the straw discharging wheel of the continuous conveying preloading device, the opening at the rear end of pick up the straw stubble harvesting device and the feed throat of the continuous conveying preloading device are connected, continuous conveying preloading device and the feed throat of a lower feeding type compression bonding device are connected through hood.

Pick up the straw stubble harvesting device by coping pickup attachment, cutting and conveying mechanism, the first hydraulic motor, the hydraulic up-down mechanism. The cutting and conveying mechanism includes a frame of header, auger on the header, cutting knife, header extension holder. The header frame is fixed on the third axis of a straw discharging wheel, cutting knife mounted in the front of header frame, the cutting knife driven by the first hydraulic motor and reciprocating cutting movement for harvesting stubble field; the header extension holder fixed on the header frame and the axis of straw discharging mechanism are connected by the bearing; The header conveying auger is mounted on the cutting table frame by a bearing and can rotate under the drive of the first hydraulic motor.

The coping pick-up mechanism includes coping sliding plate, coping wheel, coping frame, spike-tooth cylinder, the coping frame via the first axis connected to the header frame, under the rear of coping frame welded frame holder. The frame holder which on the header frame can be holed when header frame up, supporting the coping pickup mechanism weight; coping sliding plate and coping wheel mounted on the coping frame through bearing, and is located below the coping frame, at the rear of the coping frame and at the upper end of the side of the header frame is connected by the first tension spring and the first connecting bolts, make the coping frame to form the lever structure which the fulcrum is the first axis. The first tension spring is in a tensional state pressure the coping picking mechanism to the ground and result in the coping sliding plate and coping wheel close to the ground; the spike tooth roller mounted on the second axis which driven by the first hydraulic motor, the roller rotated around the second axis mounted in the coping frame.

At the rear-end of the cylinder of the first hydraulic cylinder in the hydraulic lifting mechanism and the frame of the walking device are connected and can rotate around the second pin through the second pin, in the front of the hydraulic rod in the first hydraulic cylinder and the tail end of the ear on the header frame are connected through the third pin and can rotate around the third pin.

The walking device is equipped with a speed measuring radar on its frame, and the speed measuring radar is connected with a control system.

The control system and the first hydraulic motor are connected, according to the speed of bundling machine measured of the speed measuring radar with respect to the forward speed, reach the speed of spike-tooth roller and the speed of cutter cutting speed linkage adjustment by adjusting the output speed of the first hydraulic motor.

Preferred, the continuous conveying preloading device consist in a straw discharging device and a negative pressure type auger arranged in longitudinal direction.

The straw discharging device includes a straw discharge wheel, the first arc plate, second plate, the straw discharging wheel mounted on the third axis, the first arc plate and the second located below the straw discharge wheel, the front part of the first arc plate and header frame are connected, and the first arc plate and the header frame could rotate around the third axis, the second arc plate and the back end cover in the spiral conveyor are connected. There are a overlap region in a angle from 40°-60° between the first arc plate and second when header height dropped to the lowest point, the overlap region is the concentric arc plate with the center of the third axis, the left and right ends of the first are plate and second arc board has a side plate welded and connected with the third axis.

The negative pressure type spiral convey device includes third arc board, auger casing and auger feed, transmission auger is located in the internal spiral conveyor casing, spiral conveyor casing is a sealed, and its back and the feeding throat of lower feeding type compression bundling device are connected. The third are plate located in the front of the feed throat of feeding auger, auger casing, and tangent with spiral lines of the first arc plate and feeding auger, it are also closely linked with the both sides of second arc plate, leaving only 150 mm-300 mm height opening for feeding throat.

Preferred, it includes a bale conveying array device and bale stacking device, bale conveying array device and the discharge port of the lower feeding type compression bundling device are connected; bale stacking device located in the side of the lower feeding type compression bundling device, bale conveying array device located between the side of bale discharging hole of the lower feeding type compression bundling device and bale stacking device for completing conveying and counting bale.

The bale conveying array device comprises a conveying slide way and the counting system of transportation, hydraulic straw pushing device. The slide way comprises a inclined designed conveying plate, the higher section of conveying plate and the straw outlet of lower feed type compression bundling device are connected, on the conveying plate is uniformly distributed with a plurality of rolling bearing, a guide rod mounted on both sides of the conveying plate, the conveying plate and guide rod are arranged on the machine frame.

Delivery counting system mainly includes the cuboid spike-tooth roll with push straw aside and a counter, the cuboid reel roller described is mounted on the transmission shaft, and is located in the lower at the end of the inclined transport plate, transmission shaft mounted on the frame through the bearing, and is connected with the hydraulic motor through the coupling, the second hydraulic motor is mounted on the frame. The counter is located above the reel roller and is connected to the control system.

Described in hydraulic push straw aside device mainly includes the base plate of push device, two second hydraulic cylinder, connecting rod and push plate. The push device chassis has a groove, the hydraulic cylinder described is located in the groove, the cylinder block of the second hydraulic cylinder are connected to the frame, hydraulic pole connected to the connecting rod, the connection rod described is vertical to hydraulic lever, push plate is fixed in two link rod by bolts, the hydraulic cylinder is connected with control system.

The bale stacking device is located at the tail of the chassis in the push device. According to counter records after a number of straw bale and the number of push floor can accommodate the bale, the control system control the hydraulic cylinder push the straw bale at the top of base plate on the push device to bale storage device at the same time, then automatically reset.

Preferred, the bale stacking device described consist in multiple elevate plate, a pulley system, stepping motor and straw tank. At the two side of wall all have concave grooves of the external body opposite the straw tank, at the top of the straw tank which its four corners set crown block respectively fixed on the top of frame. Top frame fixed stepping motor, the stepping motor described and the shaft are connected through coupling, shaft and the frame on the top of straw tank connected through the bearing, cylinder is connected to the shaft. The lifting plate has a protruding part on the four corners, and the shape of the lifting plate is the same as the section shape of the straw tank. The protruding part is perforated. Multiple elevating plates are stacked, connected by soft ropes and located in the straw tank. The spacing between the two adjacent elevating plates can accommodate the bale. The top of the elevating board has a soft rope in the hole of the protruding section, and the soft rope is wound around the fixed pulley and the upper end is connected to the rotor.

The stepping motor described is connected to the control system, according to a number of bale the counter records and the number of the bale elevating plate can accommodate, it control the stepping motor to adjust the number of plate, alert and remind of the need to discharge the straw because the straw tank has reached the fullest.

Preferred, it has a hollow lower supporting rod fixed on the top of the guide rod. The terminally upper supporting rod described is inserted into the lower supporting rod, the lower support rob is designed with the ear, on the upper supporting rod is designed with the axial movement of the block, the count support shaft fixed on the upper supporting rod, there is the second tension spring between the end of the count support shaft and the ear for connecting each other. The counter mounted on the count support shaft, at least one roller mounted on the count support shaft through the bearing. The roller described located above the central of the reel roller. The counter counts on the basis of the lifting action of the counting support shaft.

Preferred, the gap between the feed auger, transmission auger and screw conveyor casing is 10 mm-4 mm.

Preferred, the pitch of the conveying auger is greater than that of the feeding auger.

Preferred, the first are plate, second are plate is solid and smooth, and the same time has a 0.5-3 mm gap between them.

Preferred, the wide of the coping bedway is 50 mm-80 mm, the clearance against ground is 20 mm-40 mm, and the diameter of coping wheel is 250 mm-350 mm.

Preferred, at the dead zone formed by the tail of the cutting knife and header conveying auger mounted the stubble cleaning roller with the brush.

This invention describe a efficient crawler-type collecting baler and automatic bale stacking system, the speed of the elastic tooth roller and the speed of the cutter driven by the first hydraulic motor through a belt and is associative adjustment; and the output speed of the first hydraulic motor defined in accordance with the related speed which radar measured of binding machine relative to the ground speed, the radar installed on the walking frame, in order to ensure cutting trajectory of cutter and trajectory of elastic tooth can meet the requirements of cutting, pick up, performance and efficiency under different operation speed. When the machine is transferred in the field, the front hydraulic pole of the first hydraulic cylinder is extended, and the whole cutting and conveying mechanism and the first arc plate work together to rotate around the third shaft, so as to enlarge the clearance to the ground and enhance the passing property.

The counter of delivery counting system record the passing bale number, when the number of bale is an integer multiple of the number of bale that push plate can accommodate, for example, if the number of push plate can accommodate n, the number of bale counter recorded is n, 2n, 3n, 4n . . . then the second hydraulic cylinders pull the push plate, the bales on the bottom of the pushing device are pushed to the baling and stacking device at the same time reset automatically. The counter of delivery counting system record the passing bale number, if the number of bale the lifting plate can accommodate is n×m, when the number of bale the counter record is n×m, then control the stepping motor drives the cylinder rotating to drive second soft rope elevate a bale height of the first lifting plate. When the number of bale is 2n×m, then control the stepping motor drives the cylinder rotating to drive second soft rope elevate a bale height of the first lifting plate twice. While the first lifting plate pulling the first soft rope push the second lifting plate to lift a bale height upward, the baler through the horn alarm to tell driver to discharge the straw until the straw tank filled with bale. Then stop the first hydraulic motor and second hydraulic motor, lift the header, control stepping motor so that the lifting plate fall to the bottom floor of straw tank under the action of gravity when the straw unloading is completed, counter reset and restart counting. The number of bale push chassis can accommodate is n, the number of bale lifting plate can accommodate is n×m, it were calculated according to the size of bale and the overall size of machine. Then can increase the number of lifting plate to accord with the requirements that can hold more bale once operation according to the overall size of the machine.

The invention aims at the need of self-propelled and high-speed pickup baler for major production areas in our country of large-scale production of rice (wheat), and designs an efficient crawler-type picking up baler and a automatic bale stacking system for the operation which contain pickup scattered crop straw, high stubble cutting, preloading, compression, baling, automatic stacking in the deep mud or small plots of rice (wheat), solving the following problems:

(1) The bale directly put in the field result in bale damp affected with water and is rot, it is time-consuming and laborious to pick up and carry two times manually;

(2) The picking device has poor adaptability to the ground result in the damage of the elastic teeth easily, and the pickup device and the cutting device can not realize the automatic matching with the operation speed and thereby affecting the cutting performance of the pickup and the stubble cutting;

(3) It is frequent to occur the feeding throat blocked between the feeding device and bundling device, and the production efficiency is got high, etc. The present invention is extremely suitable for requirements of straw high-efficiency pickup and harvest in China's deep mud paddy and rice and oil (wheat) crop rotation area, will significantly improve the performance and operation efficiency of the straw picking up and baling, it have a high automation level and wide application prospect.

In the drawings:
1—the straw pick up and stubble harvest device, 2—the continuous transmission and preloading device, 3—under feeding type bale compressing and baling device, 4—bale conveying and arraying device, 5—bale stacking device, 6—walking device, 7—bale; 101—coping picking mechanism, 102—cutting conveyor, 103—first hydraulic motor, 104—hydraulic lifting device, 101-1—coping bedway, 101-2—coping wheel, 101-3—coping frame, 101-4—the first axis, 101-5—the first tension spring, 101-6—the first connecting bolt, 101-7—frame holder, 101-8—elastic tooth cylinder, 101-9—the second axis; 102-1—the frame of header, 102-2—header conveying auger, 102-3—cutting knife, 102-4—stubble cleaning roller, 102-5—extended holder of header, 102-6—the end ear of the tail; 201—the straw discharge mechanism, 202—negative pressure spiral conveying mechanism; 201-1—straw discharge wheel, 201-2—the first arc plate, 201-3—the second arc plate, 201-4—the third axis; 202-1—feeding auger, 202-2—convey auger, 202-3—auger casing, 202-4—the third arc plate; 401—conveyor lanes, 402—delivery counting system, 403—straw hydraulic pushing device; 401-1—convey plate, 401-2—roll bearing, 401-3—guide rods; 402-1—rectangular reel roller, 402-2—coupling, 402-3—the second hydraulic motor, 402-4—transmission shaft, 402-5—wheel, 402-6—counting supporting shaft, 402-7—counter, 402-8—upper rod, 402-9—block, 402-10—under rob, 402-11—the second tension spring, 402-12—side ear, 403-1—the second hydraulic cylinder, 403-2—connecting rod, 403-3—push plate, 403-4—bolt, 403-5—groove, 403-6—bottom push plate; 501—lifting plate, 502—pulley system, 503—stepping motor, 504—straw tank; 501-1—hole, 501-2—the first lifting plate, 501-3—the second lifting plate; 502-1—the first soft rope, 502-2—the second soft rope, 502-3—fixed pulley; 503-1—cylinder, 503-2—shaft, 503-3—coupling, 503-4—frame; 504—straw tank, 504-1—groove. 601—rack, 602—speed radar, 603—walking chassis.

DETAILED DESCRIPTION OF THE INVENTION

The present invention is further described in conjunction with the drawings and specific example, but the scope of protection of the present invention is not limited to this.

Figure 1:
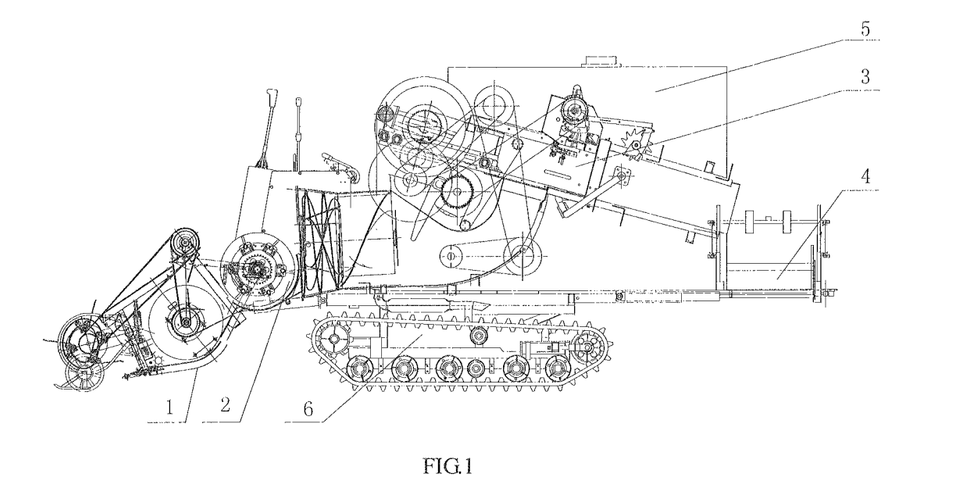
FIG. 1 is a main view of high-efficiency crawler-type pickup baler and an automatic stacking system of the present invention.

FIG. 1 shows the specific example of this invention for the high-efficiency crawler-type pickup baler and automatic bale stacking system, which includes straw picking up stubble harvesting device 1, continuous conveying preloading device 2, under feeding compressing and baling device 3, bale conveying and arraying device 4, bale stacking device 5, walking device 6 and control system. Walking device 6 is mainly consisted in a machine frame 601 and the crawler-type chassis 603. The continuous conveying and preloading device 2, under feeding baling and compressing device 3, bale conveying and arraying device 4 and bale stacking device 5 are arranged on the machine frame 601 of the walking device 6. The straw pick up and stubble harvest device 1 is located in the forefront of the whole machine and the rear mounted in the third axis 201-4 of the straw discharging wheel 201-1 of the continuous conveying preloading device 2. The opening at the rear end of pick up the straw stubble harvesting device 1 and the feeding throat of the continuous conveying preloading device 2 are connected, continuous conveying preloading device 2 and the feed throat of a under feeding type compression binding device 3 are connected through a sealed casing. The discharge outlets of the under feeding type compression and baling device 3 and the bedway of the bale conveying and arraying device 4 is connected, at the right of the bale conveying and arraying device 4 is the bale stacking device 5.

Figure 2:
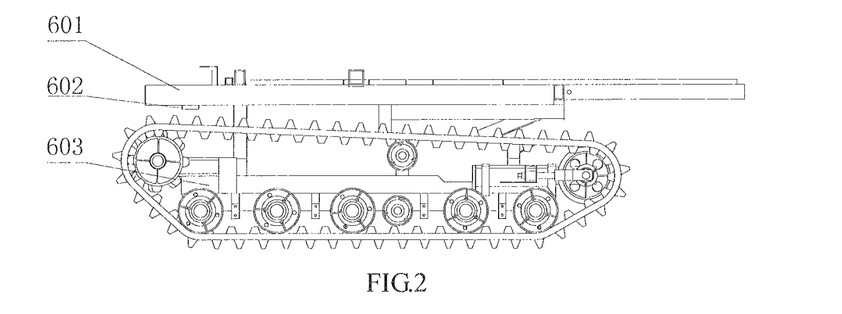
FIG. 2 is a main view of the walking device.

FIG. 2 shows the frame 601 is equipped with a speed measuring radar 602 under it and could real-time measure the speed of baler. The speed measuring radar 602 is connected with a control system and reflect the speed of machine to it. The control system control the speed of hydraulic motor to control the speed of spike-tooth roller and the speed of cut knife in order to achieve the successful operation of the straw pickup and stubble harvest.

Figure 3:
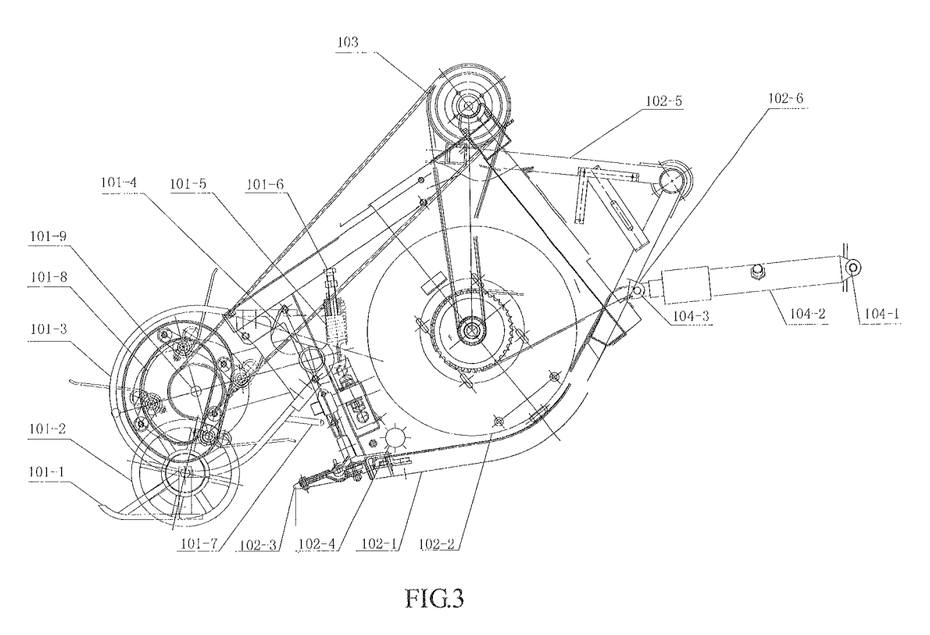
FIG. 3 is a main view of straw picking stubble harvester.

As shown in FIG. 3, the straw picking stubble harvesting device 1 is composed of a coping pickup mechanism 101, a cutting delivery mechanism 102, a first hydraulic motor 103 and a hydraulic lifting mechanism 104. The coping pickup mechanism 101 is composed of coping skateboard 101-1, coping wheel 101-2, coping frame 101-3, the first axis 101-4, the first tension spring 101-5, the first connecting bolt 101-6, the holder of frame 101-7, elastic tooth roller 101-8, and second axis 101-9. The coping frame 101-3 via the first axis 101-4 connected to the header frame 102-1 make the coping pickup device touch the ground, under the rear of coping frame 101-3 welded frame holder 101-7. The frame holder 101-7 which on the header frame 102-1 can be holed when header frame up 102-1, supporting the coping pickup mechanism 101 weight; coping sliding plate 101-1 and coping wheel 101-2 mounted on the coping frame 101-3 through bearing, and is located below the coping frame 101-3, at the rear of the coping frame 101-3 and at the upper end of the side of the header frame 102-1 is connected by the first tension spring 101-5 and the first connecting bolts 101-6, make the coping frame 101-3 to form the lever structure which the fulcrum is the first axis 101-4. The first tension spring 101-5 is in a tensional state pressure the coping picking mechanism 101 to the ground and result in the coping sliding plate 101-1 and coping wheel 101-2 close to the ground. The width of the slide plate in the coping slide plate 101-1 is 50-40 mm, and the clearance against the ground is 20-40 mm. The diameter of coping wheel 101-2 is about 250 mm. The second shaft 101-9 is positioned at the front end of the coping frame 101-3. The spike-tooth cylinder 101-8 is mounted on the second shaft 101-9 and can be driven by the first hydraulic motor 103 to rotate around the second shaft 101-9; the clearance between the spike-tooth cylinder 101-8 and the ground is determined by a coping mechanism.

Figure 13:
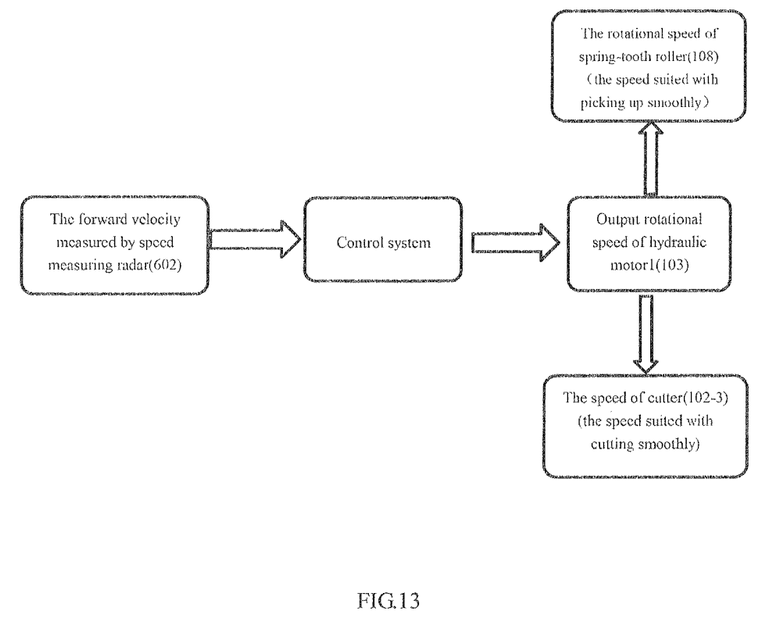
FIG. 13 is a control flow chart of a speed measured radar.

The cutting and conveying mechanism 102 consist in the frame of header 102-1, auger on the header 102-2, cutting knife 102-3 and stubble clean roller 102-4. The header frame 102-1 is fixed on the third axis 201-4 of a straw discharging wheel 201-1, cutting knife 102-3 mounted in the front of header frame 102-1, the cutting knife 102-3 driven by the first hydraulic motor 103 and reciprocating cutting movement for harvesting stubble field. The first hydraulic motor mounted on the frame of the header through a bolt. The header extension holder 102-5 fixed on the header frame 102-1 and the axis of straw discharging mechanism 201 are connected by the bearing, the whole header could rotate around the axis. The conveying auger of header 102-2 is mounted on the frame of header 102-1 through the bearing and can rotate under the drive of the first hydraulic motor 103 for collecting crop straws picked up by the elastic tooth cylinder 101-8. At the tail of the cutting knife 102-3 and the conveying auger 102-2 of the header form the dead zone where is arranged in the stubble cleaning roller 102-4 with brush, the stubble cleaning roller can rotate driven by the first hydraulic motor 103 to clean up the remaining short straw stubble cut by the cutting knife 102-3. The control system is also connected with the first hydraulic motor 103. As shown in FIG. 13, the control system according to the radar measured 602 baler relative to the ground speed adjustment of the spring tooth 101-8 and the speed of the cutter cutting speed by 102-3 linkage output speed adjustment of the first hydraulic motor 103. According to the speed of binding machine measured of the speed measuring radar 60 with respect to the forward speed, reach the speed of spike-tooth roller 101-8 and the speed of cutter 102-3 cutting speed linkage adjustment by adjusting the output speed of the first hydraulic motor 103.

At the rear-end of the cylinder of the first hydraulic cylinder 104-2 in the hydraulic lifting mechanism 104 and the frame 601 of the walking device 6 are connected and can rotate around the second pin 104-1 through the second pin 104-1, in the front of the hydraulic rod in the first hydraulic cylinder 104-2 and the tail end of the ear 102-6 on the header frame 102-1 are connected through the third pin 104-3 and can rotate around the third pin 104-3.

When the high speed pick up and harvest baler works, the front header falls to the ground at the support of the first hydraulic cylinder 104-2, and the coping wheel 101-2 is pressed on the ground under the action of the first tension spring 101-5. Spike-tooth cylinder 101-8 rotate under the drive of the first hydraulic motor 103 and pick up the crop straw scattered in the field into the straw pickup and stubble harvest device 1, meanwhile the high stubble remaining in field was cut and fall into the header, the high stubble and the crop straw under the action of the stubble cleaning roller 102-4 retro position by the header conveying auger 102-2.

The speed of the elastic tooth roller 101-8 and the speed of the cutting knife 102-3 driven by the first hydraulic motor 103 through a belt and is associative adjustment; and the output speed of the first hydraulic motor 103 defined in accordance with the related speed which radar 602 measured of baling machine relative to the ground speed, the radar installed on the frame 601 of walking device 6, in order to ensure cutting trajectory of cutter and trajectory of elastic tooth can meet the requirements of cutting, pick up, performance and efficiency under different operation speed. When the machine is transferred in the field, the front hydraulic pole of the first hydraulic cylinder 104-2 is extended, and the whole cutting and conveying mechanism 102 and the straw cutting and stubble harvest device 1 work together to rotate around the third shaft, so as to enlarge the clearance to the ground and enhance the passing property.

Figure 4:
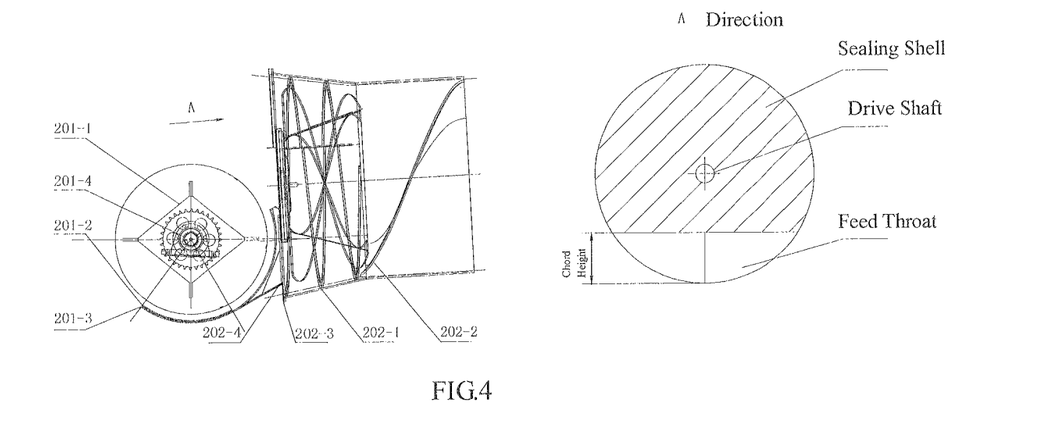
FIG. 4 is a main view of the continuous delivery preloading device.
Figure 5:
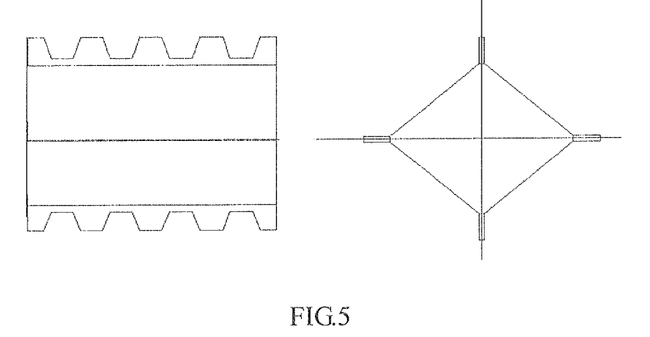
FIG. 5 is a top view and a left view of the straw discharge wheel.

As shown in FIG. 4 and FIG. 5, the continuous conveying preloading device 2 consist in a straw discharging device 201 and a negative pressure type auger 202 arranged in longitudinal direction. The straw discharging device 201 includes a straw discharge wheel 201-1, the first arc plate 201-2, the second plate 201-3, and the first arc plate 201-2 and the second plate 201-3 are solid plate. The straw discharging wheel 201-1 mounted on the third axis 201-4, the first arc plate 201-2 and second 201-3 located below the straw discharge wheel 201-1, the front part of the first arc plate 201-2 and header frame 102-1 are connected, and the first arc plate 201-2 and the header frame 102-1 could rotate around the third axis 201-4, the back end of the second arc plate 201-3 is connected to the feed port of the screw feed housing 202-3. The remaining gap between the first arc plate 201-2 and the second plate 201-3 is 0.5-3 mm.

There are a overlap region in a angle from 40°-60° between the first arc plate 201-2 and second 201-3 when header height dropped to the lowest point, the overlap region is the concentric arc plate with the center of the third axis 201-4, the left and right ends of the first arc plate 201-2 and second arc board 201-3 has a side plate welded and connected with the third axis 201-4. When the machine is transferred in the field, the front hydraulic pole of the first hydraulic cylinder 104-2 is extended, and the whole cutting and conveying mechanism 102 and the straw cutting and stubble harvest device 1 work together to rotate around the third shaft, so as to enlarge the clearance to the ground and enhance the passing property.

The negative pressure type auger 202 includes third arc board 202-4, auger casing 202-3 and feed auger 202-1, transmission auger 202-2 located in the internal auger casing 202-3. Auger casing 202-3 is a scaled, and its back and the feeding throat of under feeding type compression binding device 3 are connected. The third arc plate 202-4 located in the front of the feed throat of feeding auger 202-1, auger casing 202-3, and tangent with spiral lines of the first arc plate 201-2 and feeding auger 202-1, it are also closely linked with the both sides of second arc plate 201-3, only leaving a 150 mm-300 mm height opening for feeding throat. The gap between the feeding auger 202-1, convey auger 202-2 and auger casing 202-3 is 10 mm-40 mm. The auger to rotate at a high speed can form a strong axial delivery flow, improve the effect of straw backwards movement. The pitch of the auger 202-2 is greater than the feeding auger 202-1, and ensures the conveying capability of the auger is gradually increased from the front to the rear. In the continuous conveying and preloading device, the use of high-frequency straw discharge wheel then the header can quickly conveyed straw towards back and will avoid blocking of the discharge outlets of the header. Straw convey towards back under the action of feeding auger which has a larger role in conveying capacity and feeding capacity, then transform into the convey auger. The speed of straw transported is larger because of the rear pitch of convey auger became larger. The air form a zone of negative pressure because the rambling of auger and the casing is sealed, air in draft from the feeding throat of casing then the fragment straw and dust in the front of straw discharge device are sucked into the auger mechanism to maintain the driver working environment clean and tidy. In addition, the crop straw convey towards back stacking in front of feeding fork of the under feeding type baling and compressing device due to adopt the spiral-type conveying mechanism of conveying straw continuously from front to back, straw stacking and compression in front of the fork because of the under feeding baling and compressing device intermittent feeding by using fork.

As shown in FIG. 6, FIG. 7, FIG. 8 and FIG. 9, bale conveying and arraying device 4 and the discharge port of the under feeding type compression and baling device 3 are connected; bale stacking device 5 located in the side of the under feeding type compression and baling device 3, bale conveying and arraying device 4 located between the side of bale discharging hole of the under feeding type compression and binding device 3 and bale stacking device 5 for completing bale conveying and counting.

Figure 6:
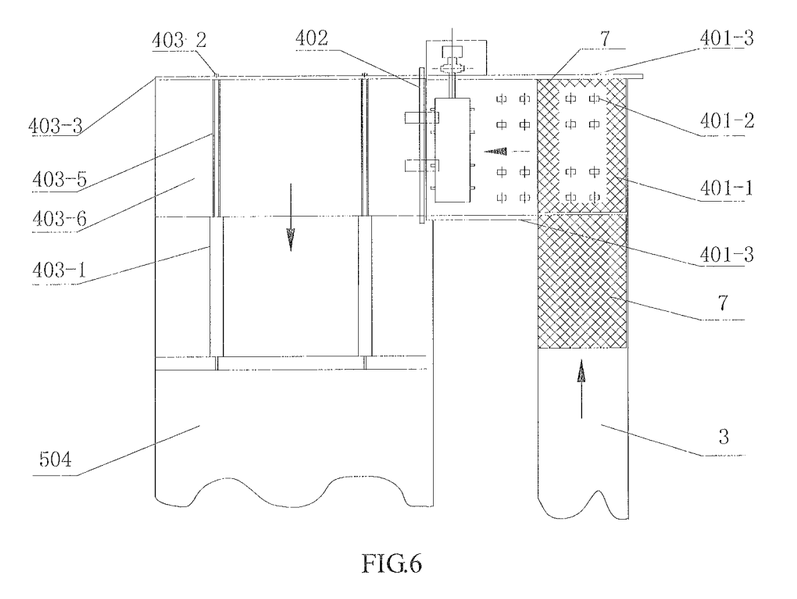
FIG. 6 is a top view of a bale convey and array device in which arrows indicate the direction of the bales.
Figure 7:
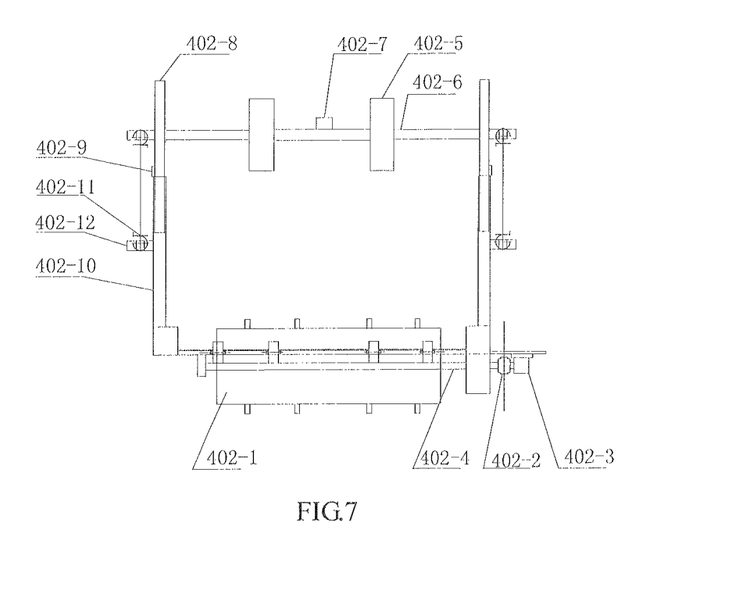
FIG. 7 is a main view of a straw convey and array device.
Figure 8:
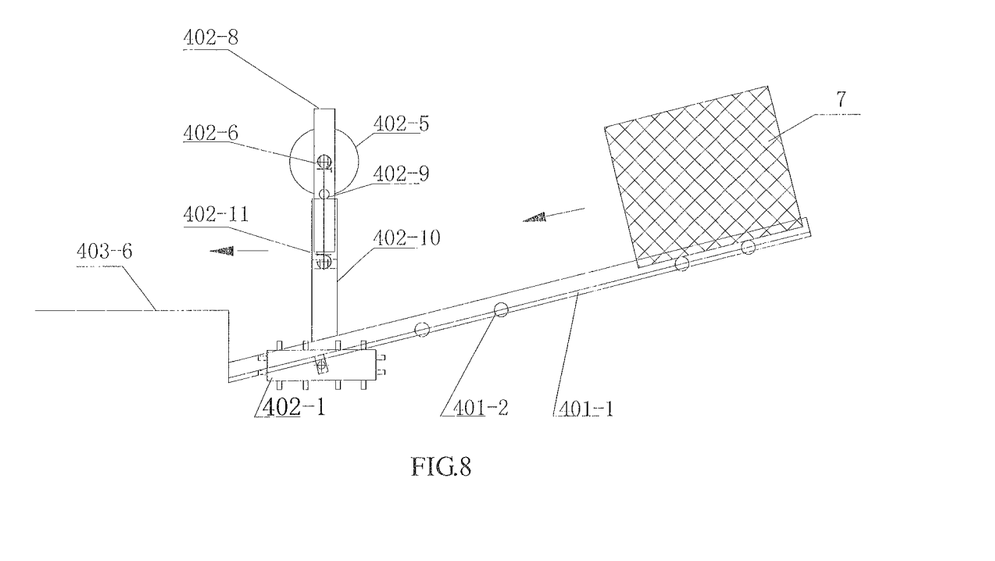
FIG. 8 is a left view of a straw convey and array device in which arrows indicate the direction of the bales.
Figure 9:
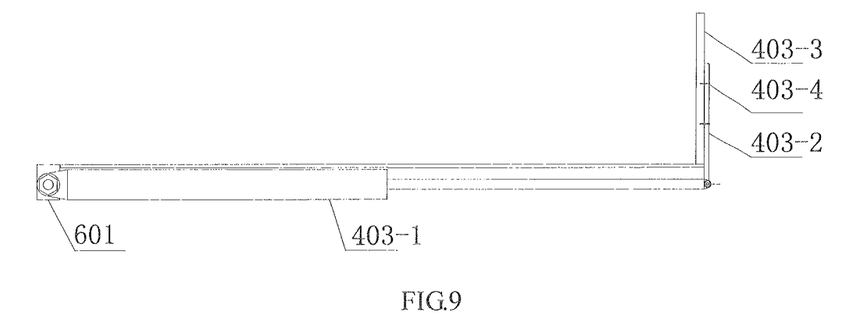
FIG. 9 is a main view of the hydraulic push straw device.

The bale conveying and arraying device 4 is comprised of a conveying slide way 401, the counting system of transportation 402 and hydraulic straw pushing device 403. The slide way 401 comprises a inclined designed conveying plate 401-1, the higher section of conveying plate 401-1 and the straw outlet of lower feed type compression binding device 3 are connected, and the straw bale which leaves the straw outlet falls directly on the inclined conveying plate 401-1 in the conveying slide way 401 under the action of gravity, on the conveying plate 401-1 is uniformly distributed with a plurality of rolling bearing 401-2 to reduce the sliding resistance of bale. A guide rod 401-3 mounted on both sides of the conveying plate 401-1 to ensure that the bales do not deviate from the conveying chute 401 and enter the conveying counting system 402 the conveying plate 401-1 and guide rod 401-3 are arranged on the machine frame 601.

Delivery counting system 402 mainly includes the cuboid spike-tooth roll with push straw aside 402-1 and a counter 402-7, the cuboid reel roller 402-1 described is mounted on the transmission shaft 402-4, and is located in the lower at the end of the inclined transport plate 401-1, transmission shaft 402-4 mounted on the frame 601 through the bearing, and is connected with the hydraulic motor 402-3 through the coupling 402-2, the second hydraulic motor 402-3 is mounted on the frame 601. It has a hollow lower supporting rod 402-10 fixed on the top of the guide rod 401-3 which located in the two sides of the reel roller 402-1. The terminally upper supporting rod 402-8 described is inserted into the lower supporting rod 402-10, the lower support rob 402-10 is designed with the ear 402-12, on the upper supporting rod 402-8 is designed with the axial movement of the block 402-9, the count support shaft 402-6 fixed on the upper supporting rod 402-8, there is the second tension spring 402-11 between the end of the count support shaft 402-6 and the ear 402-12 for connecting each other. The lower part of the upper support rod is tightly pressed in the cavity of the lower support rod 402-10 and can slide in the cavity. The counter mounted on the count support shaft 402-6, positioned above the straw roller and connected with the control system. At least one roller 402-5 mounted on the count support shaft 402-6 through the bearing. The roller 402-5 described located above the central of the reel miler 402-1. The counter 402-7 counts on the basis of the lifting action of the counting support shaft 402-6. Ensure accuracy of count and avoid wrong. The upper support rod 402-8 is inserted into the lower support rod 402-10 by a block 402-9 fixed on itself, and the depth of insertion can be adjusted by the position of the block 402-9 to meet the requirements of different sizes of bale heights.

The bales dropped on the slide 401 from the outlet, slide to the low end of slide 401 under the gravity. When the bale touch the reel roller 402-1, then the bale was grabbed and uplift to the front of push plate, at the same time bale jacking the roller 402-5 to drive the counter 402-7 counts. When the reel roller grasp and carry up the next straw bales, the last bale in front of the push plate will move to next position, and so on.

Figure 14:
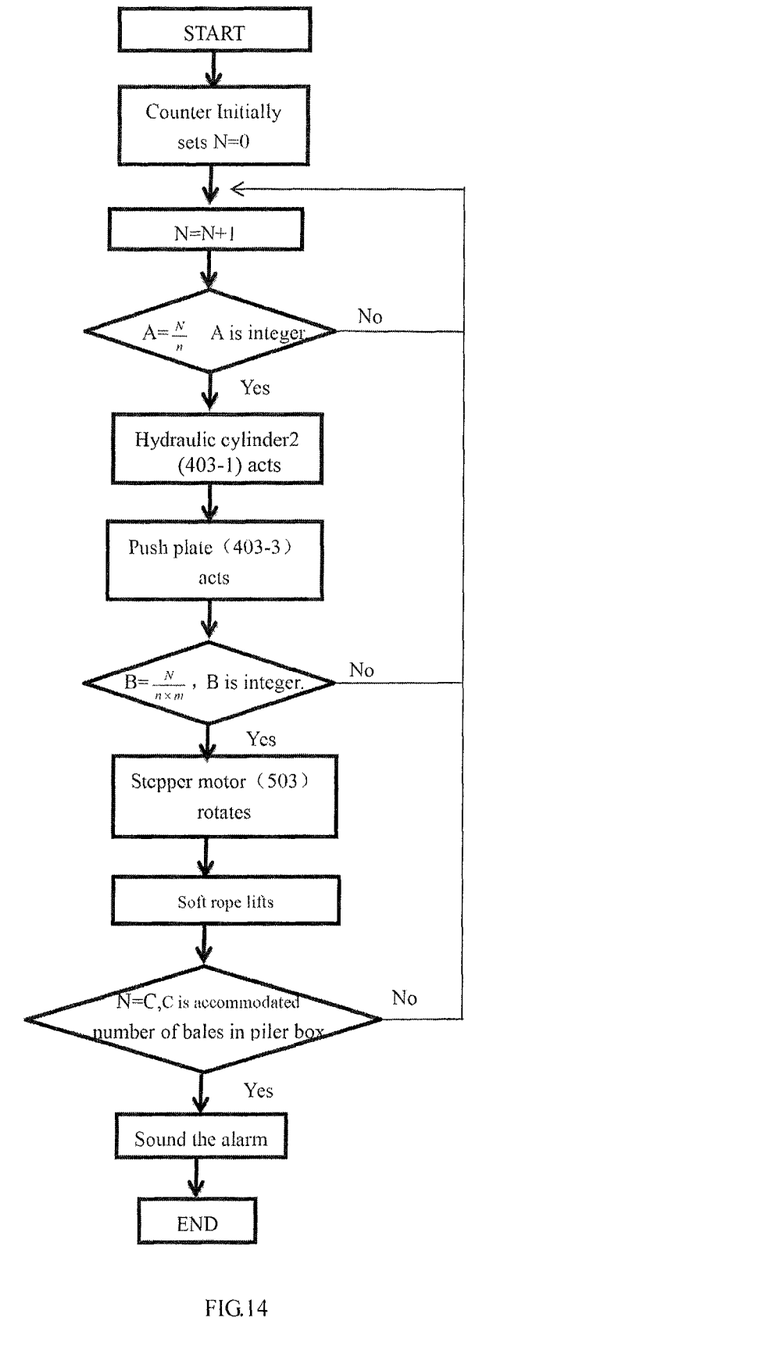
FIG. 14 is a flow chart of a bale count stacking control system.
Figure 15:
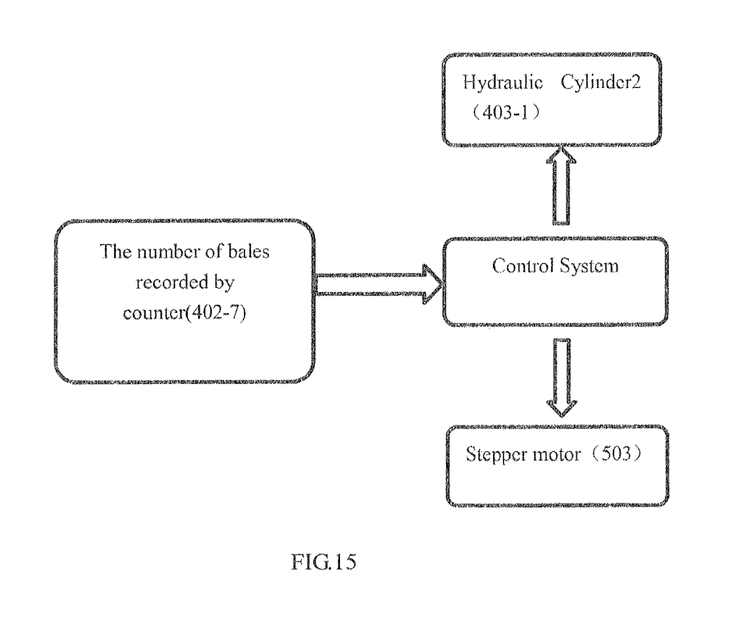
FIG. 15 is a flow chart of counter control system.
Figure 16:
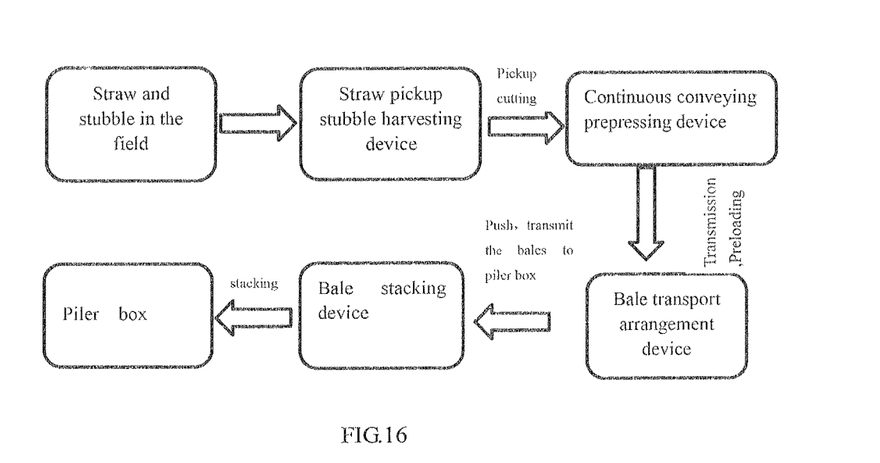
FIG. 16 is a working flow chart of an efficient crawler-type pickup baler and a bale automatic stacking system.

As shown in FIG. 14, FIG. 15, FIG. 16, the counter 402-7 of delivery counting system 402 record the passing bale number, when the number of bale is an integer multiple of the number of bale that push plate 403-6 can accommodate, for example, if the number of push plate 403-6 can accommodate is n, and the number of bale counter 402-7 recorded is n, 2n, 3n, 4n . . . then the second hydraulic cylinders 402-1 pull the push plate 402-3, the bales on the bottom of the pushing device 406-3 are pushed to the baling and stacking device 5, at the same time reset automatically.

Figure 10:
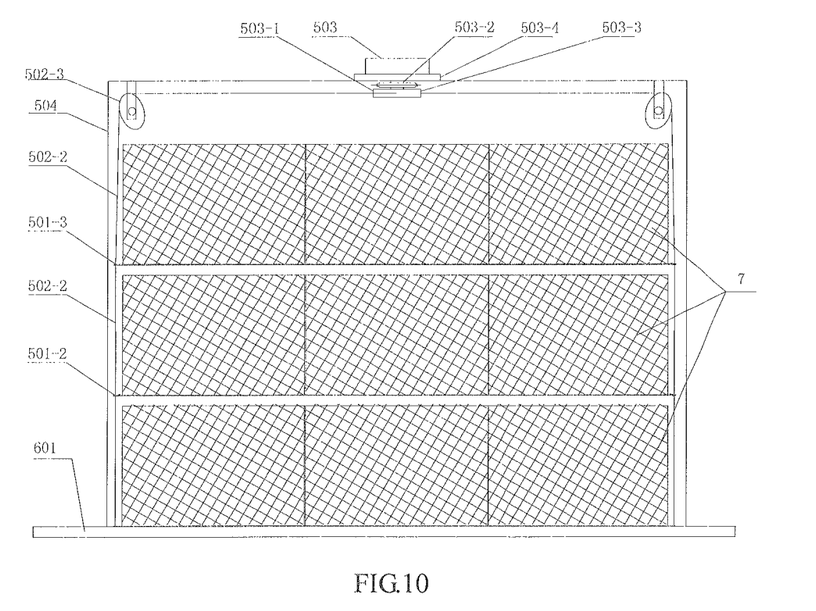
FIG. 10 is a main view of a bale stacker.
Figure 11:
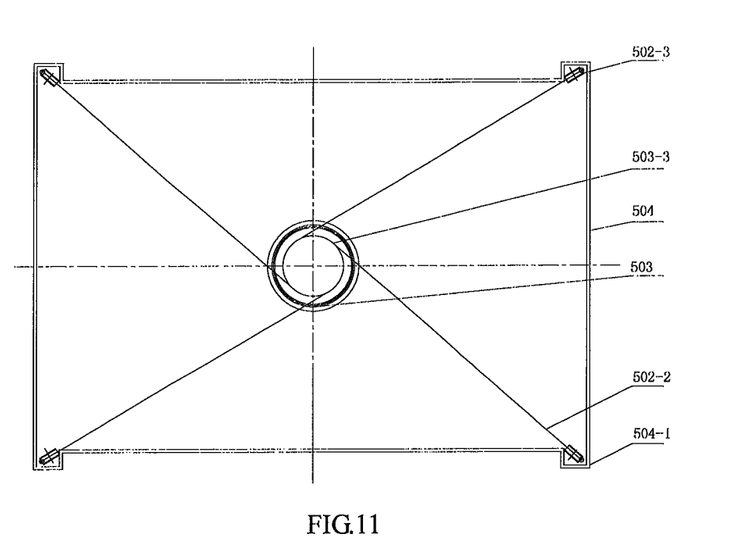
FIG. 11 is a top view of a bale stacking device.
Figure 12:
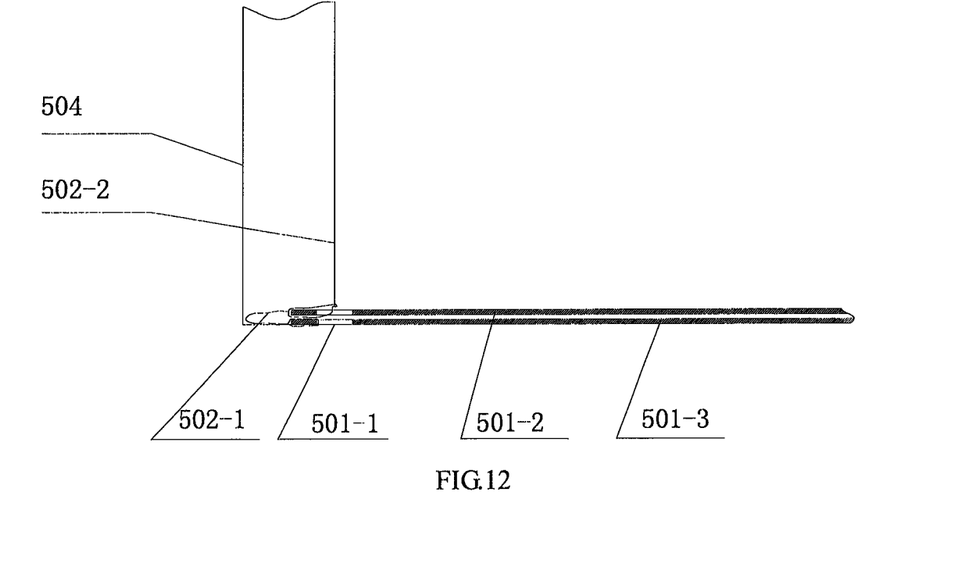
FIG. 12 is a partial view of a bale stacker.

As shown in FIGS. 10, 11 and 12, bale stacking device 5 consists of lifting plate 501, pulley system 502, stepping motor 503 and straw tank 504. The four corners of the lifting plate 501 are provided with protruding plates, both of which are provided with holes 501-1, and both sides of the straw tank 504 are provided with grooves 504-1, and the protrusion plates of the lifting plate 501 can be moved up and down along the grooves 504-1. The first lifting plate 501-2 and second lifting plate 501-3 are connected by the first soft rope 502-1 which respectively on the hole 501-1 of lifting plate, the length of the first soft rope 502-1 is a height of straw, the holes of the first lifting plate 501-2 tying the second soft rope 502-2, the second soft rope 502-2 twine around pulley 502-3 and the upper end which is connected with the cylinder 503-1, the fixed pulley 502-3 which located at the top of four corners of the straw tank 504 are installed on the top rack of the straw tank 504. The cylinder 503-1 mounted on the axis 503-2, the axis 503-2 and the top rack of straw tank 504 are connected through the bearing, and also connected with the stepping motor 503 by coupling 503-3, the stepping motor 503 is mounted on the top frame of straw tank 504 through the frame 503-4.

As shown in FIG. 15, the counter 402-7 of delivery counting system 402 record the passing bale number, if the number of the bale the lifting plate 501 can accommodate is n×m, when the number of bale the counter 402-7 record is n×m, then control the stepping motor 503 drives the cylinder 503-1 rotating to drive second soft rope 502-2 elevate a bale height of the first lifting plate 502-1. When the number of bale is 2n×m, then control the stepping motor 503 drives the cylinder rotating to drive second soft rope 502-2 elevate a bale height of the first lifting plate 501-2 twice. While the first lifting plate 501-2 pulling the first soft rope 502-1 push the second lifting plate 501-3 to lift a bale height upward, the baler through the horn alarm to tell driver to discharge the straw until the straw tank 504 filled with bale. Then stop the first hydraulic motor 103 and second hydraulic motor 402-3, lift the header, control stepping motor 503 so that the lifting plate 501 fall to the bottom floor 504 of straw tank under the action of gravity when the straw unloading is completed, counter reset and restart counting.

The specific example described is preferred implement of the invention, but the invention is not limited to the above method of the implement. It belong to the scope of protection if the technical staff in this field can make any obviously improvement, replacement and modification under the circumstance of does not deviate from the substance of the invention.

The invention claimed is:

1. A high-efficiency crawler-type pickup baler and bale stacking system, comprising a straw pickup and stubble harvesting device, a continuous conveying preloading device, an under feeding compression and binding device, a walking device and a control system, wherein the continuous conveying preloading device, the under feeding type compression and binding device, a bale conveying and arraying device and the bale stacking device are all arranged on a frame of the walking device; the straw pickup and stubble harvesting device is mounted on a third axis of a straw discharging wheel of the continuous conveying preloading device, an opening at a rear end of the straw pick up and stubble harvesting device and a feed throat of the continuous conveying preloading device are connected, the continuous conveying preloading device and a feed throat of the under feeding type compression and binding device are connected through a hood;

wherein the straw stubble harvesting device includes a pickup attachment, a cutting and conveying mechanism, a first hydraulic motor, and a hydraulic updown mechanism; wherein the cutting and conveying mechanism includes a header frame, an auger on the header frame, a cutting knife, and a header extension holder, wherein the header frame is fixed on the third axis of a straw discharging wheel, the cutting knife is mounted in the front of the header frame, and the cutting knife is driven by the first hydraulic motor in a reciprocating cutting movement for harvesting stubble field; wherein the header extension holder is fixed on the header frame and the axis of the straw discharging wheel connected by a first bearing; and a header conveying auger is mounted on a cutting table frame by a bearing and rotatable under the drive of the first hydraulic motor;

a coping pick-up mechanism which includes a coping sliding plate, a coping wheel, a coping frame, and a spike-tooth cylinder, wherein the coping frame is connected via a first axis to the header frame, under a rear of the copying frame welded frame holder; the welded frame holder on which on the header frame is adapted to be held, supporting the coping pickup mechanism; wherein the coping sliding plate and the coping wheel are mounted on the coping frame through a second bearing, below the coping frame at a rear of the coping frame, and an upper end of the side of the header frame is connected by a first tension spring and first connecting bolts, forming a coping frame lever structure in which a fulcrum is a first axis; a first tension spring which is in a tensional state pressure adapted to press the coping pick-up mechanism toward the ground and resulting in the coping sliding plate and coping wheel being pressed close to the ground; a spike tooth roller mounted on a second axis driven by the first hydraulic motor, and a roller rotatable around a second axis mounted in the coping frame;

a rear-end of a cylinder of the first hydraulic motor in the hydraulic lifting mechanism and a frame of the walking device are connected through a second pin and rotatable around the second pin, in a front of a hydraulic rod in the first hydraulic cylinder and a tail end of a rear on the header frame are connected through the third pin and rotatable around the third pin;

wherein the walking device is equipped with a speed measuring radar on its frame, and the speed measuring radar is connected to the control system; and wherein the control system is connected to the first hydraulic motor, according to a speed of binding machine measured by the speed measuring radar with respect to a forward speed, reaches a speed of spike-tooth roller and a speed of cutter cutting speed linkage adjustment by adjusting an output speed of the first hydraulic motor.

2. The high-efficiency crawler-type pickup baler and automatic bale stacking system of claim 1, wherein the continuous conveying preloading device comprises a straw discharging device and a negative pressure type auger arranged in a longitudinal direction;

the straw discharging device includes a straw discharge wheel, a first arc plate, and a second plate, wherein in the straw discharging wheel is mounted on the third axis, a first plate and a second arc are located below the straw discharge wheel, a front part of the first arc plate and the header frame are connected, and the first arc plate and the header frame are adapted to rotate around the third axis, a back end of the second plate and casing of the auger are connected, wherein there is an overlap region in a angle of from 40°-60° between the first plate and the second plate when the header height is dropped to the lowest point, the overlap region is the concentric are plate with the center of the third axis, left and right ends of the first arc plate and the second arc board have a side plate welded and are connected with the third axis; and the negative pressure type auger includes a third arc plate, an auger casing and feed auger, and a transmission auger located in the auger casing; wherein the auger casing is a sealed; and the back and a feeding throat of the under feeding type compression and binding device are connected; the third arc plate is located in a front of the feed throat of the feeding auger and auger casing, and are tangented with spiral lines of the first arc plate and feeding auger and are also closely linked with both sides of second arc plate, leaving a 150 mm-300 mm height opening for the feeding throat.

3. The high-efficiency crawler-type pickup baler and automatic bale stacking system of claim 1, further comprising a bale conveying and arraying device and bale stacking device, wherein the bale conveying and arraying device and the discharge port of the under feeding type compression and binding device are connected; the bale stacking device is located in a side of the under feeding type compression and binding device, the bale conveying and arraying device is located between a side of the bale discharging hole of the under feeding type compression and the binding device and bale stacking device for completing bale conveying and counting;

the bale conveying and arraying device comprises a conveying slideway and a counting and delivery system, and the hydraulic straw pushing device; the conveying slideway comprises a inclined designed conveying plate, a higher section of conveying plate and a straw outlet of lower feed type compression and binding device are connected, on the conveying plate is uniformly distributed with a plurality of rolling bearings, a guide rod is mounted on both sides of the conveying plate, and the conveying plate and guide rod are arranged on the machine frame;

the counting system and delivery system includes a cuboid spike-tooth roll with a push bale aside device and a counter, a cuboid reel roller is mounted on the transmission shaft, and is located in a lower end of the inclined transport plate, a transmission shaft is mounted on the frame through the bearing, and is connected with the first hydraulic motor through the coupling, the second hydraulic motor is mounted on the frame; the counter is located above the reel roller and is connected to the control system;

the push bale aside device includes a base plate of push device, two second hydraulic cylinders, a connecting rod and push plate; the push device chassis has a groove, the hydraulic cylinder is located in the groove, the cylinder block of the second hydraulic cylinder are connected to the frame, and a hydraulic pole connected to the connecting rod, the connection rod is vertical to the hydraulic lever, and a push plate is fixed in two link rods by bolts, the hydraulic cylinder is connected with the control system; and the bale stacking device is located at a tail end of the binding device in the push device wherein the counter is adapted to record records after a number of straw bales and the number of push floor can accommodate the bales, and, wherein the control system of the hydraulic cylinder is adapted to control the second hydraulic cylinders to push the straw bale at the top of base plate on the push device to bale storage device at the same time, then automatically reset.

4. The high-efficiency crawler-type pickup baler and automatic bale stacking system according to claim 3, wherein the bale stacking device comprises multiple lifting plates, a pulley system, a stepping motor and a straw tank; at two sides of the walls all have concave grooves of an external body opposite the straw tank, at a top of the straw tank which its four corners set crown block respectively fixed on a top of the frame; the top frame having fixed thereto a stepping motor, the stepping motor and a shaft are connected through a coupling, the shaft and the frame on the top of straw tank being connected through a third bearing, a cylinder is connected to the shaft; the lifting plates each having a protruding part on the four corners, and a shape of the lifting plates is the same as a section shape of the straw tank, the protruding part is perforated; multiple lifting plates are stacked, connected by ropes and located in the straw tank; a spacing between the two adjacent lifting plates being adapted to accommodate a bale; a top of the lifting plates having a rope in the hole of the protruding section, and the rope circumvents the fixed pulley and the upper end is connected to the rotor;

the stepping motor is connected to the control system, according to a number of bales the counter records and the number of the bales the lifting plates can accommodate, to control the stepping motor to adjust the number of lifting plates, alert and remind of the need to discharge the straw once the straw tank has reached its capacity.

5. The high-efficiency crawler-type pickup baler and automatic bale stacking system according to claim 3, further comprising a hollow lower supporting rod fixed on a top of the guide rod; a terminally upper supporting rod being inserted into a lower supporting rod, the lower supporting rod having an ear, on the upper supporting rod is designed with an axial movement of a block, a count support shaft fixed on the upper supporting rod, a second tension spring between an end of the count support shaft and the ear for connecting each other, the counter mounted on the count support shaft, at least one roller mounted on the count support shaft through a fourth bearing; the roller being located above a center of the reel roller; wherein the counter is adapted to count on a basis of a lifting action of the counting support shaft.

6. The high-efficiency crawler-type pickup baler and automatic bale stacking system according to claim 1, wherein the feed auger, the transmission auger and the screw conveyor casing have a 10 mm-40 mm gap between them.

7. The high-efficiency crawler-type pickup baler and automatic bale stacking system according to claim 1, wherein the pitch of the conveying auger is greater than that of the feeding auger.

8. The high-efficiency crawler-type pickup baler and automatic bale stacking system according to claim 1, wherein the first arc plate, second arc plate are solid and smooth, and have a 0.5-3 mm gap between them.

9. The high-efficiency crawler-type pickup baler and automatic bale stacking system according to claim 1, wherein a width of the coping bedway is 50 mm-80 mm, has a clearance above the ground of 20 mm-40 mm, and a diameter of coping wheel is 250 mm-350 mm.

10. The high-efficiency crawler-type pickup baler and automatic bale stacking system according to claim 1, wherein at a dead zone formed by the tail of the cutting knife and header conveying auger is mounted the stubble cleaning roller with the brush, and wherein the stubble cleaning roller driven by the first hydraulic motor.

* * * * *

UNITED STATES PATENT AND TRADEMARK OFFICE
CERTIFICATE OF CORRECTION

PATENT NO. : 10,674,670 B2
APPLICATION NO. : 15/741147
DATED : June 9, 2020
INVENTOR(S) : Xu et al.

Page 1 of 1

It is certified that error appears in the above-identified patent and that said Letters Patent is hereby corrected as shown below:

In the Claims

Claim 5, Column 16, Line 8, "each other, the counter" should be --each other; the counter--.

Signed and Sealed this
Eighth Day of October, 2024

Katherine Kelly Vidal
*Director of the United States Patent and Trademark Office*